(12) United States Patent
Xia et al.

(10) Patent No.: US 11,387,972 B2
(45) Date of Patent: Jul. 12, 2022

(54) SYSTEM AND METHOD FOR ALLOCATING RESOURCE BLOCKS

(71) Applicant: ZTE CORPORATION, Guangdong (CN)

(72) Inventors: Shuqiang Xia, Guangdong (CN); Xianghui Han, Guangdong (CN); Wen Zhang, Guangdong (CN); Chunli Liang, Guangdong (CN); Jing Shi, Guangdong (CN); Min Ren, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 156 days.

(21) Appl. No.: 16/871,607

(22) Filed: May 11, 2020

(65) Prior Publication Data

US 2020/0274683 A1    Aug. 27, 2020

Related U.S. Application Data

(63) Continuation of application No. PCT/CN2017/111728, filed on Nov. 17, 2017.

(51) Int. Cl.
  *H04L 12/28*   (2006.01)
  *H04L 5/00*    (2006.01)
  *H04W 72/04*   (2009.01)
  *H04J 1/16*    (2006.01)

(52) U.S. Cl.
  CPC .......... *H04L 5/0094* (2013.01); *H04L 5/0044* (2013.01); *H04W 72/042* (2013.01); *H04W 72/0453* (2013.01)

(58) Field of Classification Search
  CPC ..... H04L 47/70; H04L 5/0041; H04L 5/0094; H04W 72/04; H04W 72/0453; H04W 72/0446
  USPC ......................................... 370/252, 329, 430
  See application file for complete search history.

(56) References Cited

U.S. PATENT DOCUMENTS

| 9,220,104 | B2 * | 12/2015 | Dinan | H04L 27/2601 |
| 2013/0051345 | A1 * | 2/2013 | Ciochina | H04L 5/0091 370/329 |
| 2014/0307692 | A1 * | 10/2014 | Hong | H04L 47/70 370/329 |
| 2018/0176892 | A1 * | 6/2018 | Kim | H04W 52/04 |
| 2018/0220404 | A1 * | 8/2018 | Awad | H04W 4/70 |
| 2019/0349896 | A1 * | 11/2019 | Yu | H04W 72/042 |

FOREIGN PATENT DOCUMENTS

| EP | 2136503 B1 | 8/2015 |
| WO | 2010016737 A2 | 2/2010 |
| WO | 2017000376 A1 | 1/2017 |

* cited by examiner

*Primary Examiner* — John Pezzlo
(74) *Attorney, Agent, or Firm* — Duane Morris LLP

(57) ABSTRACT

A system and method for allocating network resources are disclosed herein. In one embodiment, the system and method are configured to perform: determining a first resource indication value indicative of a first subset of a plurality of resource blocks to be allocated to a wireless communication device, wherein the first resource indication value is determined by a predefined equation using a single combination of a first parameter and a second parameter as an input; and transmitting the first resource indication value to the wireless communication device.

18 Claims, 8 Drawing Sheets

---

700

702 — BS TRANSMITS DCI INCLUDING RIV TO UE

704 — UE RECEIVES DCI AND RIV AND USES RIV TO DETERMINE $RB_{START}$ AND $L$ VALUES

706 — UE THEN USES $RB_{START}$ AND $L$ VALUES TO DETERMINE WHICH BRs UE CAN USE FOR SUBSEQUENT COMMUNICATIONS

SYSTEM AND METHOD FOR ALLOCATING RESOURCE BLOCKS

TECHNICAL FIELD

The disclosure relates generally to wireless communications and, more particularly, to systems and methods for allocating resource blocks.

BACKGROUND

In wireless communications, when a base station (BS) is preparing to transmit and receive data from a user equipment (UE), a scheduling process is typically performed before the BS actually transmits and receives the data from the UE. Such a scheduling process typically provides some control information (e.g., downlink control information (DCI)) that is transmitted through one or more physical channels (e.g., physical downlink control channel (PDCCH)) to the UE. In particular, the control information comprises various specified parameters that the UE may use for receiving and transmitting the data such as, for example, parameters for resource block (RB) allocation.

In general, the BS has various ways for allocating respective RBs to the UE through downlink and uplink communications. In the downlink communication, the above-mentioned DCI that comprises the parameters for RB allocation can be provided in various formats (hereinafter "DCI formats"). For example, the BS uses a resource indication value (RIV) to indicate a respective contiguous sequence of RBs that can be used by the UE, and more specifically, the RIV is determined based on a starting RB location and a length of the contiguous sequence of RBs, which is typically known as DCI format 1A or 1B.

Based on different numbers of the RBs desired to be allocated, the RIV is typically presented as a range of integer values (e.g., 0 to 20), and is then used to determine how many bits (digital bits) the BS/UE will need to accommodate all the values of the RIV. For example, when RIV ranges from 0 to 20, the number of bits that can accommodate all the values of the RIV (i.e., 21) is at least 5 (because $2^5 > 21 > 2^4$).

Conventional formats to allocate the RBs, including the above-mentioned type 2 downlink DCI format and uplink type 0 DCI format, are directed to allocating one or more "contiguous" sequence of RBs such as, for example, plural sequences with a common fixed starting resource block location but each with a "contiguously" increasing/decreasing length of RBs, plural sequences with a common fixed length of the RBs but each with a "contiguously" increasing/decreasing starting RB location, etc.

In the 5G network, however, various communication demands for respective applications (e.g., Internet of Things (IoT), massive Machine Type Communication (mMTC), etc.), are emerging, which may require one or more non-contiguous sequences of RBs to be used. For example, in some cases, plural sequences of RBs may be desired, wherein the plural sequences of RBs have a common fixed starting RB location but each has a "non-contiguously" increasing/decreasing length (e.g., 5, 10, 15, 20, etc.) of the RBs. Conventional formats for allocating RBs, however, require the starting RB location and/or length of the RB sequences to increase/decrease contiguously. Thus, for non-contiguously increasing or decreasing RB sequence lengths, or non-contiguous starting RB locations, such conventional formats would require extra overhead bits to account for such variations and, thus disadvantageously cause a waste of bits. Although some techniques in terms of calculating an RIV have been proposed to indicate such non-contiguously increasing or decreasing RB sequence lengths and/or starting RB locations, the techniques generally encounter various issues. For example, the RIV is not determined only by one single combination of an RB sequence length and a starting RB location (i.e., one RIV is associated with plural combinations of RB sequence lengths and starting RB locations). Accordingly, between the BS and UE, additional protocols may be required to be established so as to determine one from the plural combinations, which disadvantageously limits the allocation of the RBs. Therefore, existing formats and/or techniques for allocating RBs are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method includes: determining a first resource indication value indicative of a first subset of a plurality of resource blocks to be allocated to a wireless communication device, wherein the first resource indication value is determined by a predefined equation using a single combination of a first parameter and a second parameter as an input; and transmitting the first resource indication value to the wireless communication device.

In a further embodiment, a method includes: receiving, by a wireless communication device, a first resource indication value indicative of a first subset of a plurality of resource blocks to be allocated to the wireless communication device, wherein the first resource indication value is determined by a predefined equation using a single combination of a first parameter and a second parameter as an input; and based on the received first resource indication value, determining the respective identifiers of the first subset of the plurality of resource blocks allocated to the wireless communication device.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
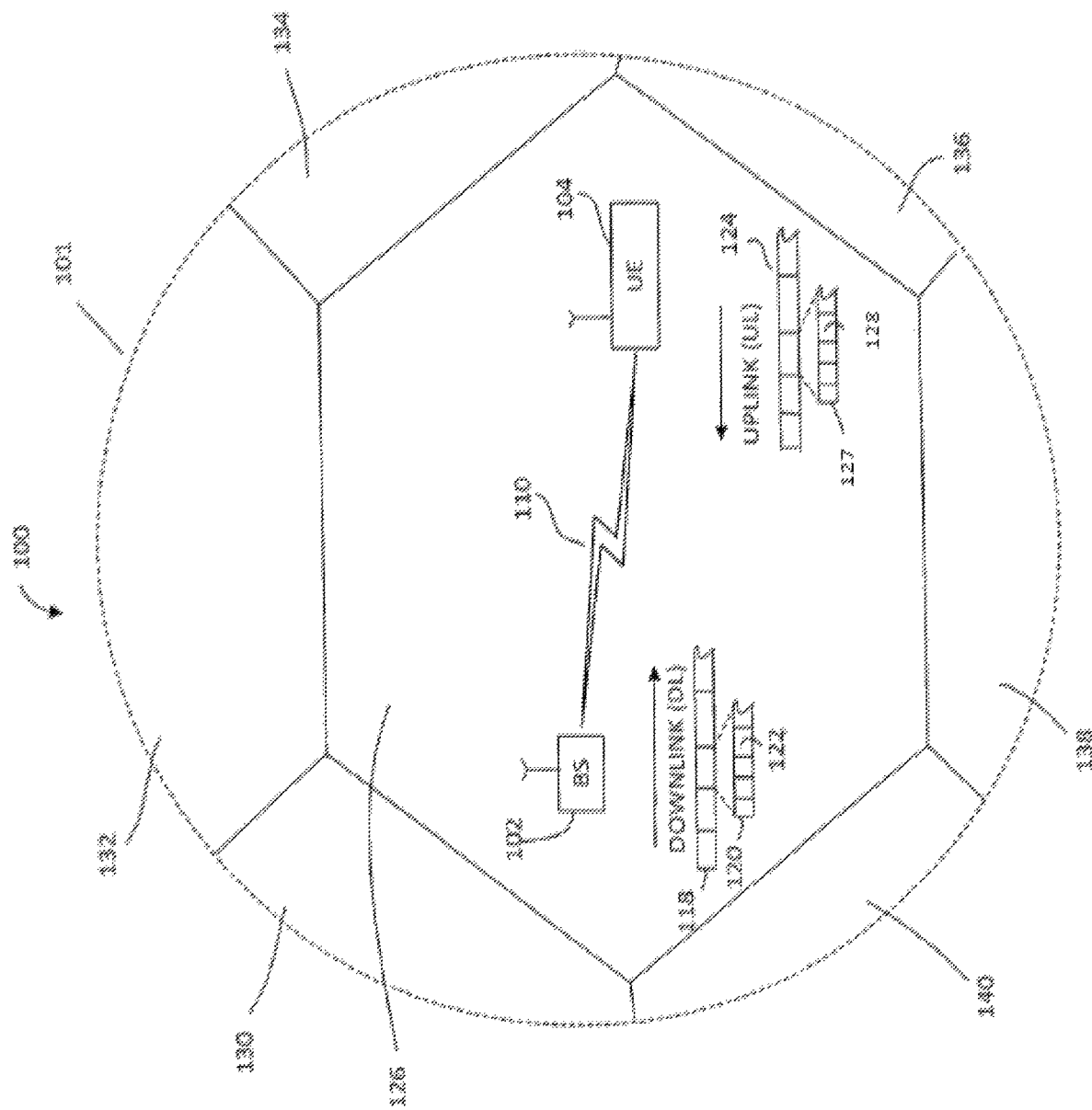
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. The exemplary communication network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within the geographic boundary of cell 126. Each of the other cells 130, 132, 134, 136, 138 and 140 may include at least one base station operating at its allocated bandwidth to provide adequate radio coverage to its intended users. For example, the base station 102 may operate at an allocated channel transmission bandwidth to provide adequate coverage to the UE 104. The base station 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention.

Figure 2:
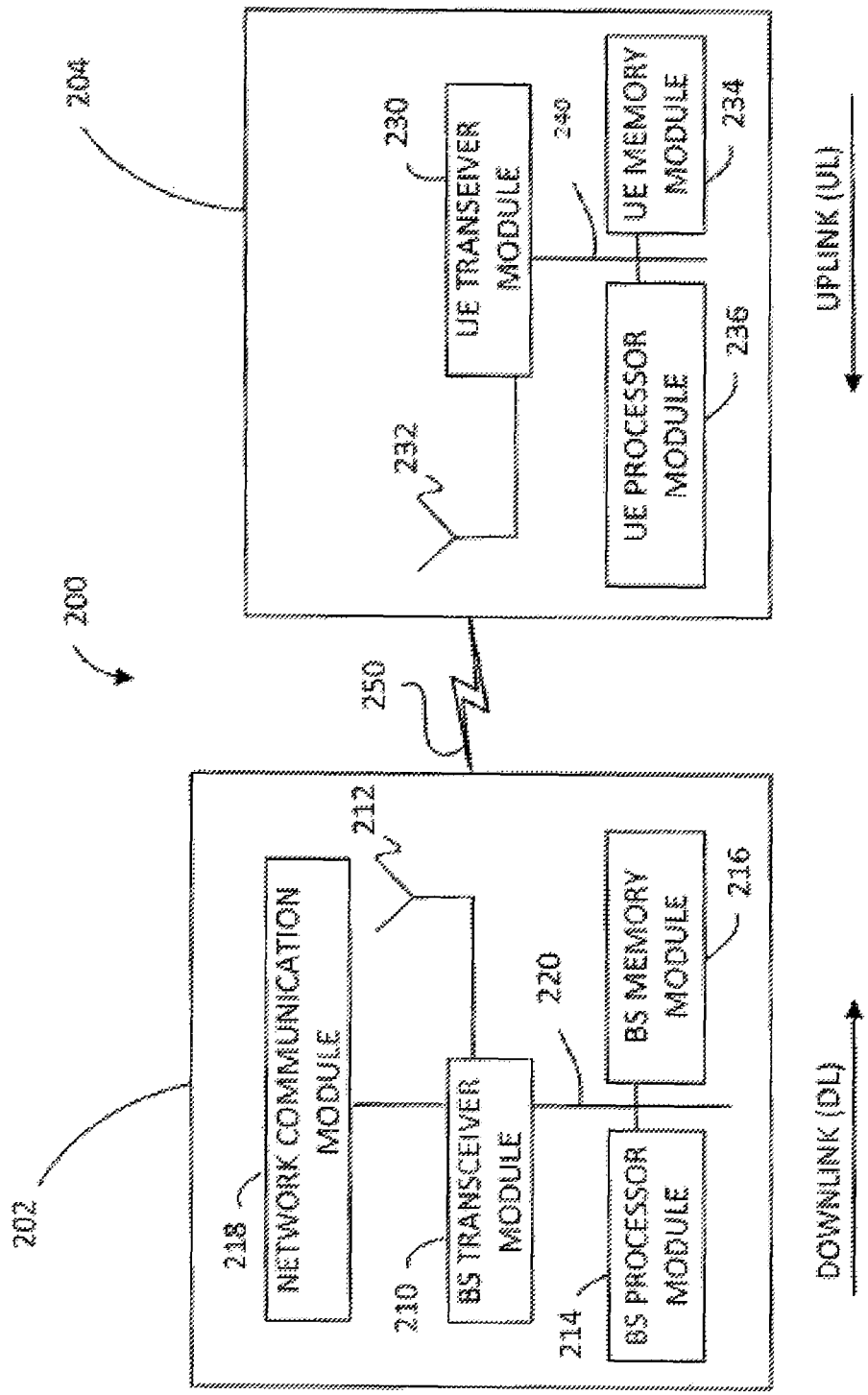
FIG. 2 illustrates block diagrams an exemplary base station and a user equipment device, in accordance with some embodiments of the present disclosure.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 608 and the base station transceiver 602 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 602 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Referring again to FIG. 1, as discussed above, when the BS 102 is preparing to transmit and receive data from the UE 104, a scheduling process is typically performed before the BS actually transmits and receives the data from the UE 104. During such a scheduling process, control information such as DCI that includes resource block (RB) allocation information is typically transmitted from the BS 102 to the UE 104 via one or more physical channels, e.g., a PDCCH.

Various embodiments of methods for a BS to allocate one or more sub-sequences of RBs selected from a plurality of RBs for a UE and use RIVs (resource indication values) to indicate such one or more sub-sequences of RBs are disclosed. In some embodiments, the BS may assign respective identifiers for the plurality of RBs that are available for the UE to use. In some embodiments, such identifiers may be logically contiguous and can be correspond to either contiguous or noncontiguous RBs. Further, although some exemplary embodiments herein provided are directed to allocating RBs, it is noted that systems and methods in such exemplary embodiments can be used for allocating any of a variety of resources such as, for example, frequency resources, time resources (e.g., frames), code resources, etc., while remaining within the scope of the present disclosure.

Specifically, in an example where the plurality of RBs that are available for the UE has a size of "N", the RBs may be associated with respective identifiers such as, 0, 1, 2, 3, . . . , and up to N−1. In some embodiments, the BS may select a portion of the plurality of RBs as the above-mentioned sub-sequence of RBs to be allocated to the UE, and may present the sub-sequence of resource blocks with a starting identifier (hereinafter "starting RB location $RB_{start}$" or simply "$RB_{start}$") and a corresponding length, i.e., a total number of RBs of the sub-sequence, (hereinafter "RB sequence length L," or simply "L"), wherein $RB_{start}$ and L are variables. Moreover, in some embodiments, possible values of $RB_{start}$ and L may be each non-contiguous, and can be each discretized based on a resolution factor $N_{step}$, which may be a positive integer predefined in a protocol established between the BS and UE. In other words, the sub-sequence of RBs has a number of "L" RBs and is started at an identifier "$RB_{start}$," and since $RB_{start}$ and L are variables, plural sub-sequence of RBs, each of which has respective $RB_{start}$ and L, may be determined by the BS. Moreover, since $RB_{start}$ and L are each discretized based on a positive integer $N_{step}$, for example, ($RB_{start}=N_{step}/2$, $3N_{step}/2$, etc.; $L=N_{step}$, $2N_{step}$, etc.), different sub-sequences of RBs may have respective $RB_{start}$ and L that are non-contiguously increased/decreased from each other. In some embodiments, after the BS determines such a sub-sequence of RBs, the BS determines a corresponding RIV indicating the sub-sequence of RBs. Various embodiments of methods to determine the RIV will be respectively discussed in detail below.

Embodiment 1

As discussed above, in a plurality of RBs with a size N, possible values of $RB_{start}$ and L can be discretized based on a resolution factor $N_{step}$, in accordance with some embodiments. In some embodiments, possible values of $RB_{start}$ and L may be respectively presented as:

$$RB_{start} = 0, N_{step}/2, N_{step}, 3N_{step}/2,$$
$$2N_{step} \ldots \left(\left\lfloor \frac{2N}{N_{step}} \right\rfloor - 2\right)\frac{N_{step}}{2} \text{ and } L = N_{step},$$
$$2N_{step} \ldots , \left\lfloor \frac{N}{N_{step}} \right\rfloor N_{step}.$$

Accordingly, respective resolutions of $RB_{start}$ and L may be presented as $N_{step}/2$ and $N_{step}$.

In an embodiment, the BS may select a sub-sequence with a starting RB location, $RB_{start}$, and an RB sequence length, L, from the plurality of RBs (in the size N). Accordingly, the BS determines an RIV associated with such a sub-sequence using the following equation (1):

$$\text{if } L' \le \lfloor (N'+1)/2 \rfloor \text{ then} \quad (1)$$
$$RIV = W(L'-1) + RB'_{start}$$
else
$$RIV = W(N'-L') + (W - RB'_{start} - 1)$$
wherein
$$W = 2\left(\left\lfloor \frac{2N}{N_{step}} \right\rfloor - N'\right) = 2\left(\left\lfloor \frac{2N}{N_{step}} \right\rfloor - \left\lfloor \frac{N}{N_{step}} \right\rfloor\right)$$
or
$$W = \begin{cases} \left\lfloor \frac{2N}{N_{step}} \right\rfloor, & N \bmod N_{step} = 0 \text{ or } N \bmod N_{step} = 1 \\ \left\lfloor \frac{2N}{N_{step}} \right\rfloor + 1, & N \bmod N_{step} = 2 \text{ or } N \bmod N_{step} = 3 \end{cases}$$

and wherein
$$RB'_{start} = 2RB_{start}/N_{step},$$
$$N' = \lfloor N/N_{step} \rfloor$$
$$L' = L/N_{step}.$$

In some cases, when
$$\left\lfloor \frac{2N}{N_{step}} \right\rfloor - 2\left\lfloor \frac{N}{N_{step}} \right\rfloor = 1,$$

the RIV can be determined by the following equation (2):

$$\text{if } (L'-1) \le \lfloor N'/2 \rfloor \text{ then} \quad (2)$$
$$RIV = (W-1)(L'-1) + RB'_{start}$$
else
$$RIV = (W-1)(N'-L'+1) + (W-2-RB'_{start})$$
wherein $W = \left\lfloor \frac{2N}{N_{step}} \right\rfloor$ and wherein $L' = L/N_{step}$,
$$RB'_{start} = 2RB_{start}/N_{step},$$
$$N' = \lfloor N/N_{step} \rfloor$$

In some embodiments, after the BS uses the above-described equation (1) or (2) to determine the RIV, the BS then incorporate the RIV into control information (e.g., DCI) and send the control information to the UE through a downlink signal (e.g., a PDCCH signal). In some embodiments, the RIV may occupy "X" bits in the control information, wherein X is determined by the following equation:

$$X = \lceil \log_2 M \rceil$$
wherein $M = N'\left(\left\lfloor \frac{2N}{N_{step}} \right\rfloor - N'\right)$.

Figure 3A:
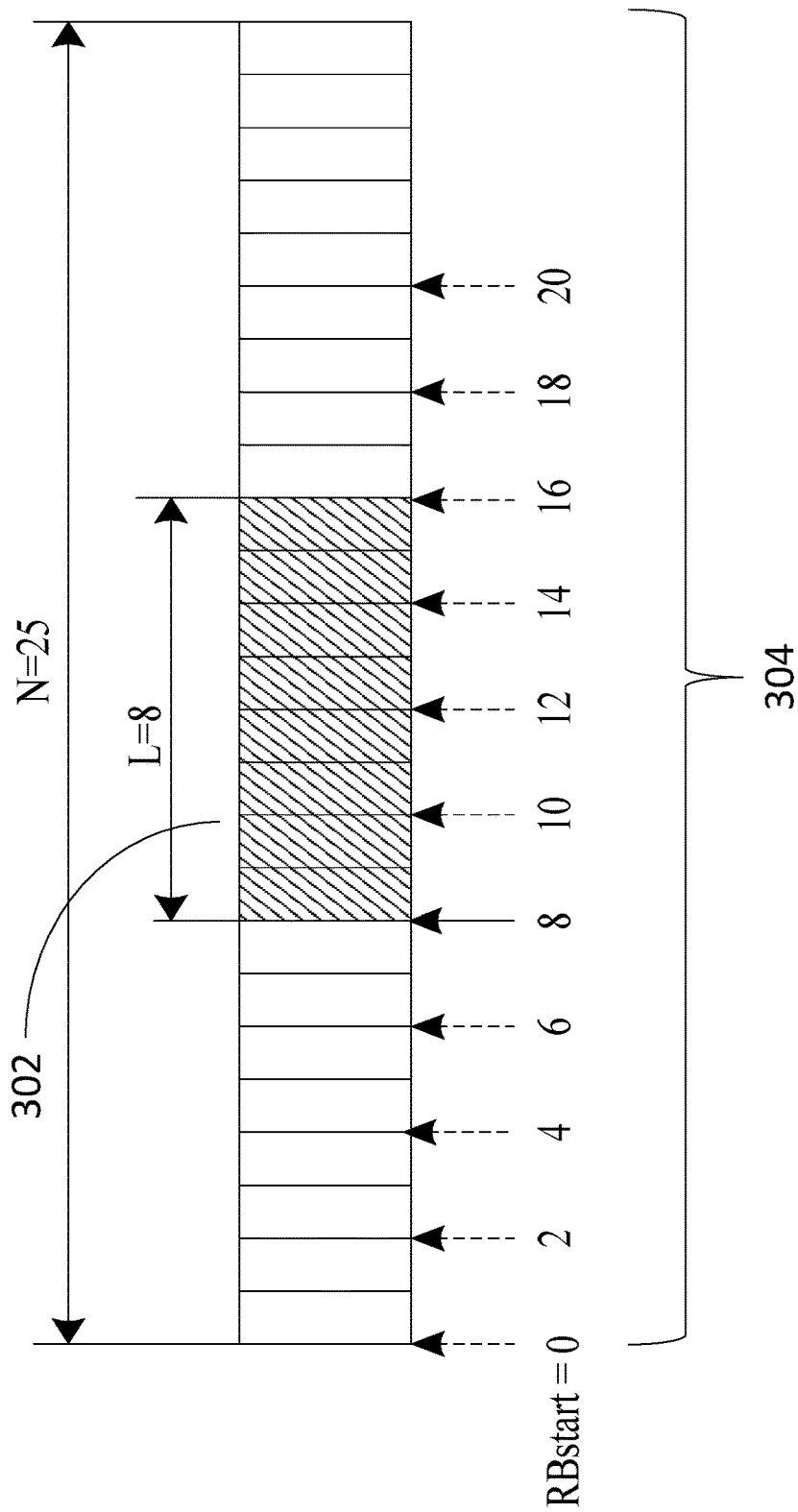
FIG. 3A illustrates an exemplary symbolic diagram showing a sub-sequence of resource blocks and how a corresponding RIV is determined by the equation (1), in accordance with some embodiments of the present disclosure.

FIG. 3A illustrates a symbolic diagram of a sub-sequence of RBs 302 selected from a plurality of RBs 304 (with N=25 and $N_{step}$=4) and how a respective RIV is determined using the equation (1), in accordance with various embodiments. As shown, the number of the plurality of RBs 304 that are available to be allocated to the UE is 25 (N). Based on the above is equation, the resolution of $RB_{start}$ is $N_{step}/2$ (4/2=2), which is also shown in FIG. 3A. In the illustrated embodiment of FIG. 3A where the BS determines the sub-sequence of RBs 302 having $RB_{start}$ and L are respectively equal to 8 and 8, since L' and N' satisfy the "if" condition of the equation (1), the RIV can be determined as 16 using the first part of the equation (1), which is further described below.

$$N' = \lfloor N/N_{step} \rfloor = \lfloor 25/4 \rfloor = 6$$
$$W = 2\left(\left\lfloor \frac{2N}{N_{step}} \right\rfloor - N'\right) = 2\left(\left\lfloor \frac{2N}{N_{step}} \right\rfloor - \left\lfloor \frac{N}{N_{step}} \right\rfloor\right) = 2\left(\left\lfloor \frac{2 \times 25}{4} \right\rfloor - \left\lfloor \frac{25}{4} \right\rfloor\right) = 12$$
$$L' = L/N_{step} = 8/4 = 2$$
$$RB'_{start} = 2RB_{start}/N_{step} = 2 \times 8/4 = 4$$
$$RIV = W(L'-1) + RB'_{start} = 12(2-1) + 4 = 16$$

Figure 3B:
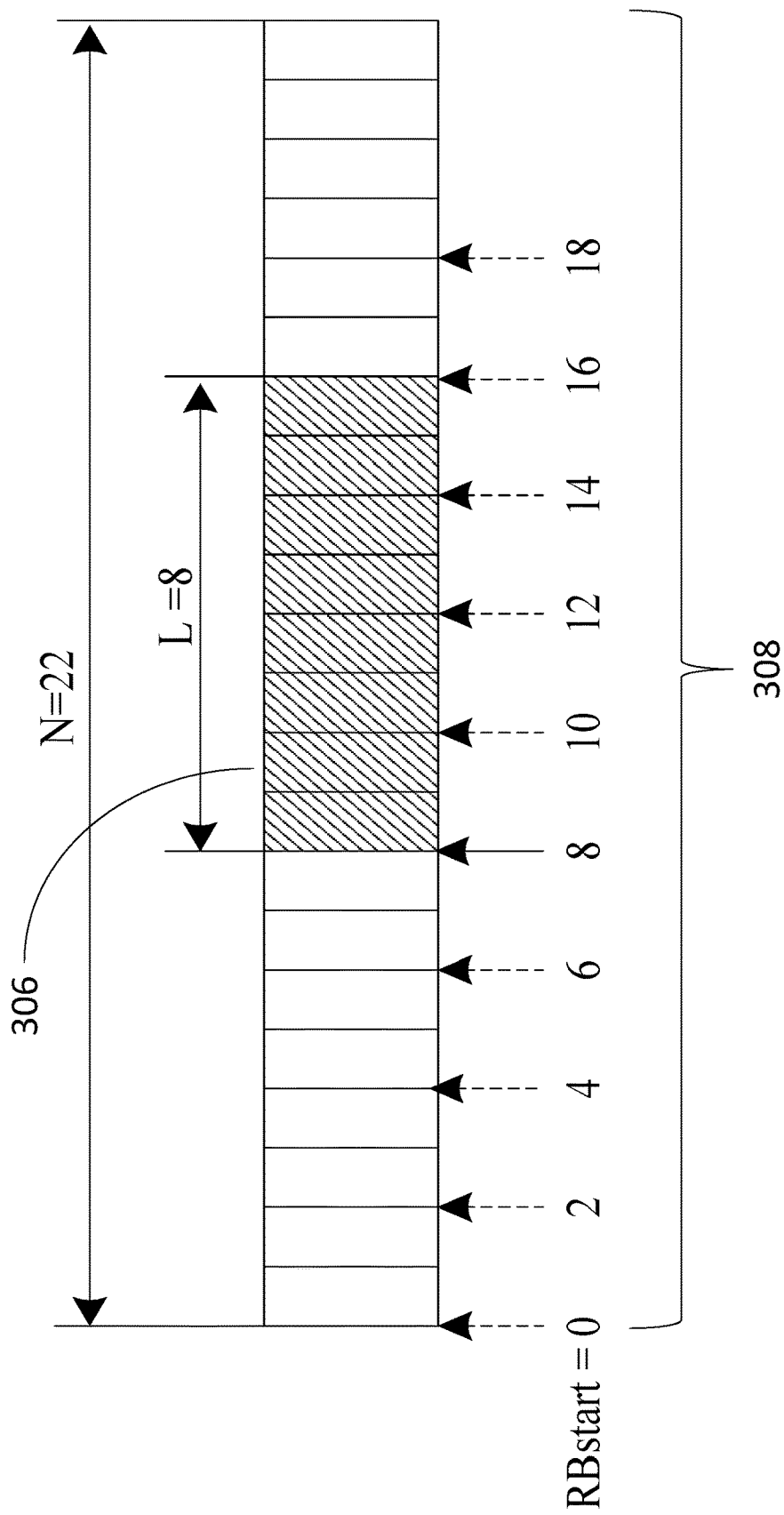
FIG. 3B illustrates an exemplary symbolic diagram showing a sub-sequence of resource blocks and how a corresponding RIV is determined by the equation (2), in accordance with some embodiments of the present disclosure.

FIG. 3B illustrates a symbolic diagram of a sub-sequence of RBs 306 selected from a plurality of RBs 308 (with N=22 and $N_{step}$=4) and how a respective RIV is determined using the equation (2), in accordance with various embodiments. As shown, the number of the plurality of RBs 308 that are available to be allocated to the UE is 22 (N). Based on the above equation, the resolution of $RB_{start}$ is $N_{step}/2$ (4/2=2), which is also shown in FIG. 3B. Further, since N and $N_{step}$ satisfy $$\left\lfloor \frac{2N}{N_{step}} \right\rfloor - 2\left\lfloor \frac{N}{N_{step}} \right\rfloor = 1,$$

the equation (2) may be used to determine a RIV. In the illustrated embodiment of FIG. 3B where the BS determines the sub-sequence of RBs 306 having $RB_{start}$ and L are respectively equal to 8 and 8, since L' and N' satisfy the "if" condition of the equation (2), the RIV can be determined as 14 using the first part of the equation (2), which is further described below.

$$N' = \lfloor N/N_{step} \rfloor = \lfloor 25/4 \rfloor = 5$$

$$W = \left\lfloor \frac{2N}{N_{step}} \right\rfloor = \left\lfloor \frac{2 \times 22}{4} \right\rfloor = 11$$

$$L' = L/N_{step} = 8/4 = 2$$

$$RB'_{start} = 2RB_{start}/N_{step} = 2 \times 8/4 = 4$$

$$RIV = (W-1)(L'-1) + RB'_{start} = (11-1) \times (2-1) + 4 = 14$$

In some cases, when N is not divisible by $N_{step}/2$, a technique may be further applied to correspond L' to L, in accordance with some embodiments. Specifically, when respective values of $RB'_{start}$ and L' satisfy $$2L' + RB'_{start} = \left\lfloor \frac{2N}{N_{step}} \right\rfloor,$$

L and L' may correspond to each other based on:

$$L = L'N_{step} + N \bmod \frac{N_{step}}{2}$$

Otherwise, $$L = L'N_{step}$$

Embodiment 2

As discussed above, in a plurality of RBs with a size N, possible values of $RB_{start}$ and L can be discretized based on a resolution factor $N_{step}$, in accordance with some embodiments. In some embodiments, possible values of $RB_{start}$ and L may be respectively presented as:

$$RB_{start} = 0, N_{step}/K, 2N_{step}/K \ldots (K-1)N_{step}/K, N_{step},$$

$$(K+1)N_{step}/K \ldots \left(\left\lfloor \frac{KN}{N_{step}} \right\rfloor - K\right)\frac{N_{step}}{K} \text{ and}$$

$$L = N_{step}, 2N_{step} \ldots \left\lfloor \frac{N}{N_{step}} \right\rfloor N_{step},$$

wherein K is a positive integer. In some embodiments, $N_{step}$ should be an integer multiple of K. Accordingly, respective resolutions of $RB_{start}$ and L may be presented as $N_{step}/K$ and $N_{step}$.

In an embodiment, the BS may select a sub-sequence with a starting RB location, $RB_{start}$, and an RB sequence length, L, from the plurality of RBs (in the size N). Accordingly, the BS determines an RIV associated with such a sub-sequence using the following equation (3):

$$\text{if } L' \leq \lfloor (N'+1)/2 \rfloor \text{ then} \tag{3}$$

$$RIV = W(L'-1) + RB'_{start}$$

else $$RIV = W(N'-L') + (W - RB'_{start} - 1)$$

wherein $$W = 2\left\lfloor \frac{KN}{N_{step}} \right\rfloor - (N'+1)K + 2$$

and wherein $$RB'_{start} = K \cdot RB_{start}/N_{step}$$

$$N' = \lfloor N/N_{step} \rfloor$$

$$L' = L/N_{step}.$$

In some embodiments, after the BS uses the above-described equation (3) to determine the RIV, the BS then incorporate the RIV into control information (e.g., DCI) and send the control information to the UE through a downlink signal (e.g., a PDCCH signal). In some embodiments, the RIV may occupy "X" bits in the control information, wherein X is determined by the following equation:

$$X = \lceil \log_2 M \rceil$$

$$\text{wherein } M = N'\left(\left\lfloor \frac{KN}{N_{step}} \right\rfloor + 1 - \frac{K(N'+1)}{2}\right).$$

Similarly, in some cases, when N is not divisible by $N_{step}/K$, a technique may be further applied to correspond L' to L, in accordance with some embodiments. Specifically, when respective values of $RB'_{start}$ and L' satisfy $$KL' + RB'_{start} = \left\lfloor \frac{KN}{N_{step}} \right\rfloor,$$

L and L' may correspond to each other based on:

$$L = L'N_{step} + N \bmod \frac{N_{step}}{K}$$

Otherwise, $$L = L'N_{step}$$

Figure 4:
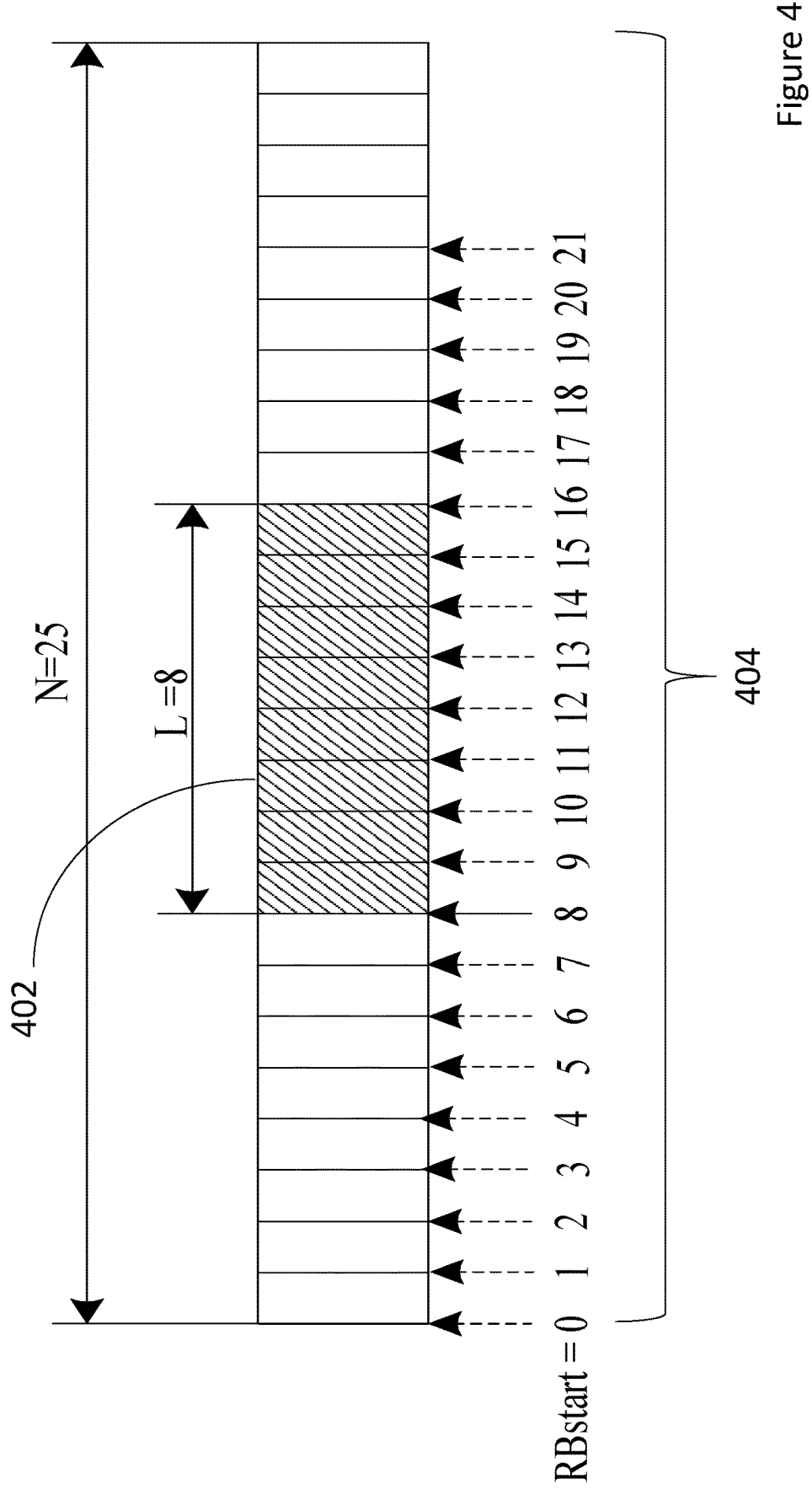
FIG. 4 illustrates an exemplary symbolic diagram showing a sub-sequence of resource blocks and how a corresponding RIV is determined by the equation (3), in accordance with some embodiments of the present disclosure.

FIG. 4 illustrates a symbolic diagram of a sub-sequence of RBs 402 selected from a plurality of RBs 404 (with N=25 and $N_{step}$=4, K=4) and how a respective RIV is determined using the equation (3), in accordance with various embodiments. As shown, the number of the plurality of RBs 404 that are available to be allocated to the UE is 25 (N). Based on the above equation, the resolution of $RB_{step}$ is $N_{step}/K$ (4/4=1), which is also shown in FIG. 4. In the illustrated embodiment of FIG. 4 where the BS determines the sub-sequence of RBs 402 having $RB_{start}$ and L are respectively equal to 8 and 8, since L' and N' satisfy the "if" condition of the equation (1), the RIV can be determined as 32 using the first part of the equation (3), which is further described below.

$$N' = \lfloor N/N_{step} \rfloor = \lfloor 25/4 \rfloor = 6$$

$$W = 2\left\lfloor \frac{KN}{N_{step}} \right\rfloor - (N'+1)K + 2 = 2\left\lfloor \frac{4 \times 25}{4} \right\rfloor - (6+1) \times 4 + 2 = 24$$

$$L' = L/N_{step} = 8/4 = 2$$

$$RB'_{start} = K \cdot RB_{start}/N_{step} = 4 \times 8/4 = 8$$

$$RIV = W(L'-1) + RB'_{start} = 24 \times (2-1) + 8 = 32$$

Embodiment 3

As discussed above, in a plurality of RBs with a size N, possible values of $RB_{start}$ and L can be discretized based on a resolution factor $N_{step}$, in accordance with some embodiments. In some embodiments, possible values of $RB_{start}$ and L may be respectively presented as:

$$RB_{start} = 0, N_{step}/2, N_{step}, 3N_{step}/2,$$

$$2N_{step} \ldots \left(\left\lceil \frac{2N}{N_{step}} \right\rceil - 2\right)\frac{N_{step}}{2} \text{ and } L = N_{step},$$

$$2N_{step} \ldots \left\lfloor \frac{N}{N_{step}} \right\rfloor N_{step}.$$

Accordingly, respective resolutions of $RB_{start}$ and L may be presented as $N_{step}/2$ and $N_{step}$. In some embodiments, the BS may divide the N RBs into $$\left\lceil \frac{2N}{N_{step}} \right\rceil$$

subsets. Accordingly, the $RB_{start}$ of the $u^{th}$ subset can be presented as $uN_{step}/2$, and if $$u = \left(\left\lceil \frac{2N}{N_{step}} \right\rceil - 1\right),$$

then the number of RBs in such an $u^{th}$ subset can be presented as $$(N-1)\text{mod}\frac{N_{step}}{2} + 1,$$

else the number of RB in such subset is equal to $N_{step}/2$ $N_{step}/2$. L includes at least an even number (other than 0) of such sub sets.

In an embodiment, the BS may select a sub-sequence with a starting RB location, $RB_{start}$, and an RB sequence length, L, from the plurality of RBs (in the size N). Accordingly, the BS determines an RIV associated with such a sub-sequence using the following equation (4):

$$\text{if } L' \le \lfloor (N'+1)/2 \rfloor \text{ then} \tag{4}$$

$$RIV = W(L'-1) + RB'_{start}$$

else $$RIV = W(N'-L') + (W - RB'_{start} - 1)$$

wherein $$W = 2\left(\left\lceil \frac{2N}{N_{step}} \right\rceil - \left\lfloor \frac{N}{N_{step}} \right\rfloor\right)$$

and wherein $RB'_{start} = 2RB_{start}/N_{step}$, $N' = \lfloor N/N_{step} \rfloor$ $L' \lceil L/N_{step} \rceil$.

In some cases, when $$\left\lceil \frac{2N}{N_{step}} \right\rceil - 2\left\lfloor \frac{N}{N_{step}} \right\rfloor = 1,$$

the RIV can be determined by the following equation (5):

$$\text{if } (L'-1) \le \lfloor N'/2 \rfloor \text{ then} \tag{5}$$

$$RIV = (W-1)(L'-1) + RB'_{start}$$

else $$RIV = (W-1)(N'-L'+1) + (W - 2 - RB'_{start})$$

wherein $W = \left\lceil \dfrac{2N}{N_{step}} \right\rceil$ and wherein $L' = \lceil L/N_{step} \rceil$, $RB'_{start} = 2RB_{start}/N_{step}$, $N' = \lfloor N/N_{step} \rfloor$ In some embodiments, after the BS uses the above-described equation (4) or (5) to determine the RIV, the BS then incorporate the RIV into control information (e.g., DCI) and send the control information to the UE through a downlink signal (e.g., a PDCCH signal). In some embodiments, the RIV may occupy "X" bits in the control information, wherein X is determined by the following equation:

$$X = \lceil \log_2 M \rceil$$

$$\text{wherein } M = N'\left(\left\lceil \frac{2N}{N_{step}} \right\rceil - N'\right).$$

Figure 5:
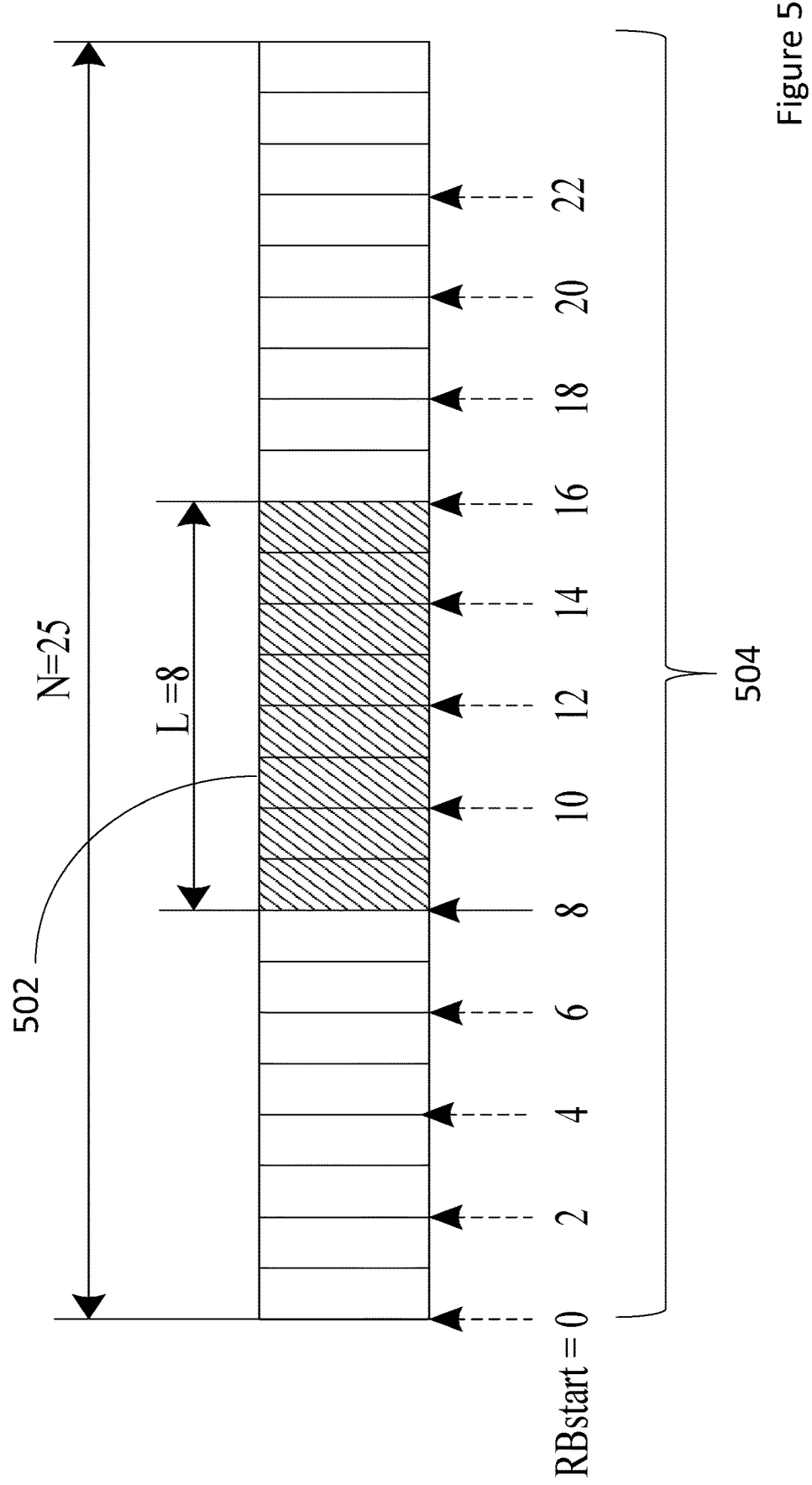
FIG. 5 illustrates an exemplary symbolic diagram showing a sub-sequence of resource blocks and how a corresponding RIV is determined by the equation (4) or (5), in accordance with some embodiments of the present disclosure.

FIG. 5 illustrates a symbolic diagram of a sub-sequence of RBs 502 selected from a plurality of RBs 504 (with N=25 and $N_{step}$=4) and how a respective RIV is determined using the equation (4), in accordance with various embodiments. As shown, the number of the plurality of RBs 504 that are available to be allocated to the UE is 25 (N). Based on the above equation, the resolution of $RB_{start}$ is $N_{step}/2$ (4/2=2), which is also shown in FIG. 5. In the illustrated embodiment of FIG. 5 where the BS determines the sub-sequence of RBs 502 having $RB_{start}$ and L are respectively equal to 8 and 8, since L' and N' satisfy the "if" condition of the equation (4), the RIV can be determined as 18 using the first part of the equation (4), which is further described below.

$$N' = \lfloor N/N_{step} \rfloor = \lfloor 25/4 \rfloor = 6$$

$$W = 2\left(\left\lceil \frac{2N}{N_{step}} \right\rceil - \left\lfloor \frac{N}{N_{step}} \right\rfloor\right) = 2\left(\left\lceil \frac{2 \times 25}{4} \right\rceil - \left\lfloor \frac{25}{4} \right\rfloor\right) = 14$$

$$L' = \lceil L/N_{step} \rceil = \lceil 8/2 \rceil = 4$$

$$RB'_{start} = 2RB_{start}/N_{step} = 2 \times 8/4 = 4$$

$$RIV = W(L'-1) + RB'_{start} = 14 \times (2-1) + 4 = 18$$

FIG. 5 also presents a symbolic diagram of a sub-sequence of RBs 502 selected from a plurality of RBs 504 (with N=25 and $N_{step}$=4) and how a respective RIV is determined using the equation (5), in accordance with various embodiments. As shown, the number of the plurality of RBs 404 that are available to be allocated to the UE is 25 (N). Based on the above equation, the resolution of $RB_{start}$ $N_{step}/2$ (4/2=2), which is also shown in FIG. 5. Further, since N and $N_{step}$ satisfy $$\left\lceil \frac{2N}{N_{step}} \right\rceil - 2\left\lfloor \frac{N}{N_{step}} \right\rfloor = 1,$$

the equation (5) may be used to determine a RIV In the illustrated embodiment of FIG. 5 where the BS determines the sub-sequence of RBs 502 having $RB_{start}$ and L are respectively equal to 8 and 8, since L' and N' satisfy the "if" condition of the equation (5), the RIV can be determined as 16 using the first part of the equation (5), which is further described below.

$$N' = \lfloor N/N_{step} \rfloor = \lfloor 25/4 \rfloor = 6$$

$$W = \left\lceil \frac{2N}{N_{step}} \right\rceil = \left\lceil \frac{2 \times 25}{4} \right\rceil = 13$$

$$L' = \lceil L/N_{step} \rceil = \lceil 8/2 \rceil = 4$$

$$RB'_{start} = 2RB_{start}/N_{step} = 2 \times 8/4 = 4$$

$$RIV = (W-1)(L'-1) + RB'_{start} = (13-1)(2-1) + 4 = 16$$

Embodiment 4

As discussed above, in a plurality of RBs with a size N, possible values of $RB_{start}$ and L can be discretized based on a resolution factor $N_{step}$, in accordance with some embodiments. In some embodiments, possible values of $RB_{start}$ and L may be respectively presented as:

$$RB_{start} = 0, N_{step}/K, 2N_{step}/K, \ldots, (K-1)N_{step}/K, N_{step},$$

$$(K+1)N_{step}/K, \ldots, \left(\left\lceil \frac{KN}{N_{step}} \right\rceil - K\right)\frac{N_{step}}{K} \text{ and}$$

-continued $$L = N_{step}, 2N_{step} \ldots \left\lfloor \frac{N}{N_{step}} \right\rfloor N_{step},$$

wherein K is a positive integer. In some embodiments, $N_{step}$ should be an integer multiple of K. Accordingly, respective resolutions of $RB_{start}$ and L may be presented as $N_{step}/K$ and $N_{step}$.

In some embodiments, the BS may divide the N RBs into subsets. Accordingly, the $RB_{start}$ of the $u^{th}$ subset can be presented as, and if $$u = \left(\left\lceil \frac{KN}{N_{step}} \right\rceil - 1\right),$$

then the number of RBs in such an $u^{th}$ subset can be presented as $$(N-1)\bmod \frac{N_{step}}{K} + 1,$$

else the number of RB in such subset is equal to $N_{step}/K$. L includes at least an integer multiple of K.

In an embodiment, the BS may select a sub-sequence with a starting RB location, $RB_{start}$, and an RB sequence length, L, from the plurality of RBs (in the size N). Accordingly, the BS determines an RIV associated with such a sub-sequence using the following equation (6):

if $L' \le \lfloor (N'+1)/2 \rfloor$ then $\quad(6)$ $RIV = W(L'-1) + RB'_{start}$ else $RIV = W(N'-L') + (W - RB'_{start} - 1)$ wherein $$W = 2\left\lceil \frac{KN}{N_{step}} \right\rceil - (N'+1)K + 2$$

$$RB'_{start} = K \cdot RB_{start}/N_{step},$$

$$N' = \lfloor N/N_{step} \rfloor$$

$$L' = \lceil L/N_{step} \rceil.$$

In some embodiments, after the BS uses the above-described equation (6) to determine the RIV, the BS then incorporate the RIV into control information (e.g., DCI) and send the control information to the UE through a downlink signal (e.g., a PDCCH signal). In some embodiments, the RIV may occupy "X" bits in the control information, wherein X is determined by the following equation:

$$X = \lceil \log_2 M \rceil$$

$$\text{wherein } M = N'\left(\left\lceil \frac{KN}{N_{step}} \right\rceil + 1 - \frac{K(N'+1)}{2}\right).$$

Embodiment 5

As discussed above, in a plurality of RBs with a size N, possible values of $RB_{start}$ and L can be discretized based on a resolution factor $N_{step}$, in accordance with some embodiments. In some embodiments, possible values of $RB_{start}$ and L may be respectively presented as:

$$RB_{start} = 0, N_{step}/2, N_{step}, 3N_{step}/2, 2 N_{step} \ldots$$
$$\left(\left\lfloor \frac{2N}{N_{step}} \right\rfloor - 2\right)\frac{N_{step}}{2} \text{ and } L = N_{step}, 2 N_{step} \ldots \left\lfloor \frac{N}{N_{step}} \right\rfloor \cdot N_{step}.$$

Accordingly, respective resolutions of $RB_{start}$ and L may be presented as $N_{step}/2$ and $N_{step}$.

In an embodiment, the BS may select a sub-sequence with a starting RB location, $RB_{start}$, and an RB sequence length, L, from the plurality of RBs (in the size N). Accordingly, the BS determines an RIV associated with such a sub-sequence using the following equation (7):

if $(L'-1) \leq \lfloor N'/2 \rfloor$ then $RIV = 2(N'(L'-1) + \lfloor RB'_{start}/2 \rfloor) + RB'_{start} \bmod 2$ else $RIV = 2(N'(N'-L'+1) + (N'-1-\lfloor RB'_{start}2 \rfloor)) + (RB'_{start} \bmod 2)$ (7)

wherein $RB'_{start} = 2RB_{start}/N_{step}$, $N' = \lfloor N/N_{step} \rfloor$ $L' = L/N_{step}$.

In some embodiments, after the BS uses the above-described equation (7) to determine the RIV, the BS then incorporate the RIV into control information (e.g., DCI) and send the control information to the UE through a downlink signal (e.g., a PDCCH signal). In some embodiments, the RIV may occupy "X" bits in the control information, wherein X is determined by the following equation:

$X = \lceil \log_2 M \rceil$ wherein $M = N'(N'+1)$.

Figure 6:
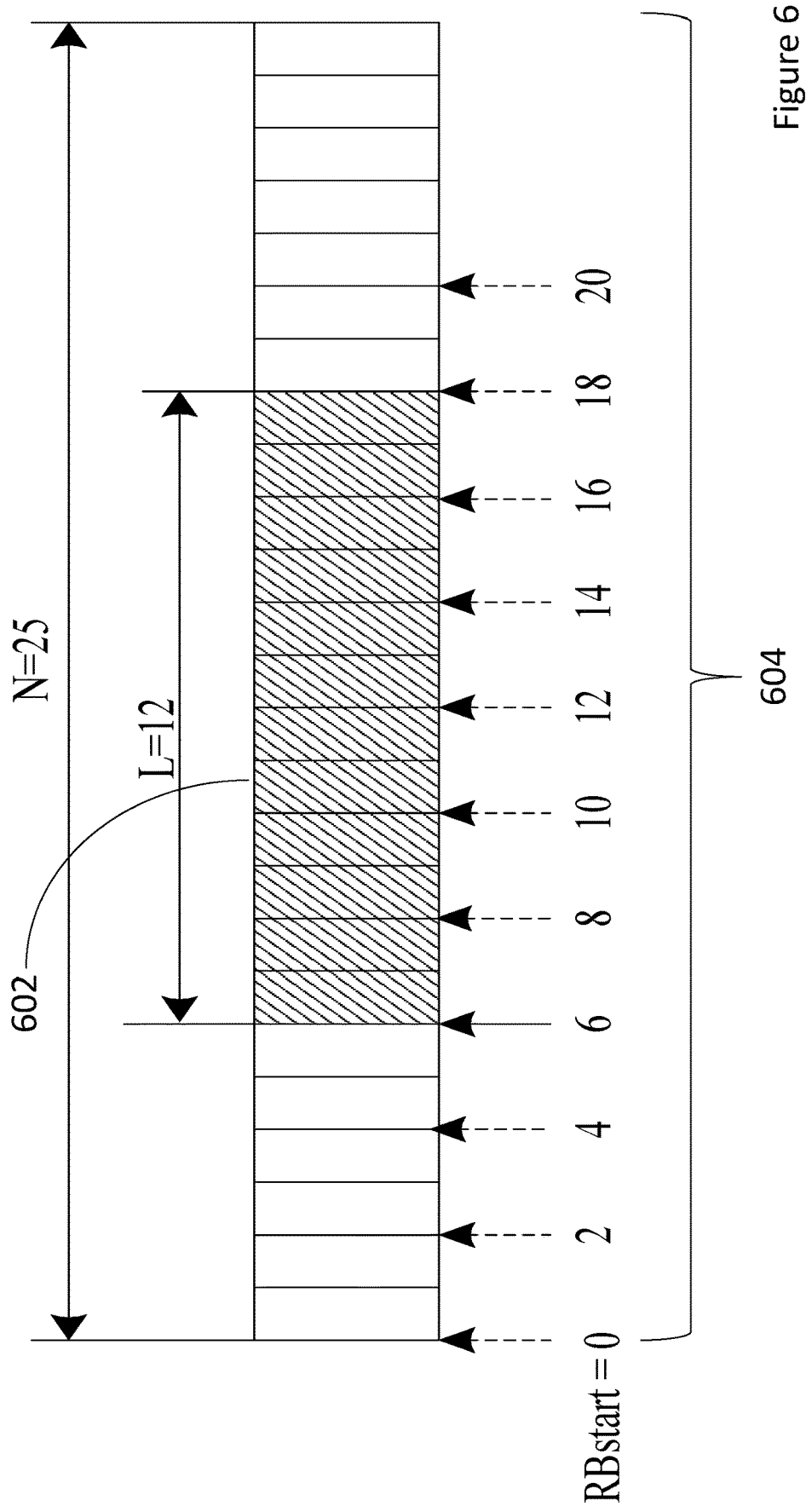
FIG. 6 illustrates an exemplary symbolic diagram showing a sub-sequence of resource blocks and how a corresponding RIV is determined by the equation (7), in accordance with some embodiments of the present disclosure.

FIG. 6 illustrates a symbolic diagram of a sub-sequence of RBs 602 selected from a plurality of RBs 604 (with N=25 and $N_{step}$=4) and how a respective RIV is determined using the equation (7), in accordance with various embodiments. As shown, the number of the plurality of RBs 604 that are available to be allocated to the UE is 25 (N). Based on the above equation, the resolution of $RB_{start}$ is $N_{step}/2$ (4/2=2), which is also shown in FIG. 6. In the illustrated embodiment of FIG. 6 where the BS determines the sub-sequence of RBs 602 having $RB_{start}$ and L are respectively equal to 6 and 12, since L' and N' satisfy the "if" condition of the equation (6), the RIV can be determined as 27 using the first part of the equation (7), which is further described below.

$N' = \lfloor N/N_{step} \rfloor = \lfloor 25/4 \rfloor = 6$ $L' = L/N_{step} = 12/4 = 3$ $RB'_{start} = 2RB_{start}/N_{step} = 2 \times 6/4 = 3$ $RIV = 2(N'(L'-1) + \lfloor RB'_{start}/2 \rfloor) + (RB'_{start} \bmod 2)$
$= 2(6(3-1) + \lfloor 3/2 \rfloor) + (3 \bmod 2)$
$= 27$ Similarly, in some cases, when N is not divisible by $N_{step}/2$, a technique may be further applied to correspond L' to L, in accordance with some embodiments. Specifically, when respective values of $RB'_{start}$ and L' satisfy $$2L' + RB'_{start} = \left\lfloor \frac{2N}{N_{step}} \right\rfloor,$$

L and L' may correspond to each other based on:

$$L = L'N_{step} + N \bmod \frac{N_{step}}{2}.$$

Otherwise, $L = L'N_{step}$

Embodiment 6

As discussed above, in a plurality of RBs with a size N, possible values of $RB_{start}$ and L can be discretized based on a resolution factor $N_{step}$, in accordance with some embodiments. In some embodiments, possible values of $RB_{start}$ L may be respectively presented as:

$$RB_{start} = 0, N_{step}/K, 2N_{step}/K \ldots (K-1)N_{step}/K, N_{step},$$
$$(K+1)N_{step}/K \ldots \left(\left\lfloor \frac{KN}{N_{step}} \right\rfloor - K\right)\frac{N_{step}}{K} \text{ and}$$
$$L = N_{step}, 2 N_{step} \ldots \left\lfloor \frac{N}{N_{step}} \right\rfloor N_{step},$$

wherein K is a positive integer. In some embodiments, $N_{step}$ should be an integer multiple of K. Accordingly, respective resolutions of $RB_{start}$ and L may be presented as $N_{step}/K$ and $N_{step}$.

In an embodiment, the BS may select a sub-sequence with a starting RB location, $RB_{start}$, and an RB sequence length, L, from the plurality of RBs (in the size N). Accordingly, the BS determines an RIV associated with such a sub-sequence using the following equation (8):

$(L'-1) \leq \lfloor N'/2 \rfloor$ then $RIV = K(N')(L'-1) + \lfloor RB'_{start}/K \rfloor) + (RB'_{start} \bmod K)$ else $RIV = K(N'(N'-L'+1) + (N'-1-\lfloor RB'_{start}/K \rfloor)) + (RB'_{start} \bmod K)$ (8)

wherein $RB'_{start} = K \cdot RB_{start}/N_{step}$ $N' = \lfloor N/N_{step} \rfloor$ $L' = L/N_{step}$.

In some embodiments, after the BS uses the above-described equation (8) to determine the RIV, the BS then incorporate the RIV into control information (e.g., DCI) and send the control information to the UE through a downlink signal (e.g., a PDCCH signal). In some embodiments, the RIV may occupy "X" bits in the control information, wherein X is determined by the following equation:

$$X = \lceil \log_2 M \rceil$$

$$\text{wherein } M = \frac{KN'(N'+1)}{2}.$$

Similarly, in some cases, when N is not divisible by $N_{step}/K$, a technique may be further applied to correspond L' to L, in accordance with some embodiments. Specifically, when respective values of $RB'_{start}$ and L' satisfy $$KL' + RB'_{start} = \left\lfloor \frac{KN}{N_{step}} \right\rfloor,$$

L and L' may correspond to each other based on $$L = L'N_{step} + N \mod \frac{N_{step}}{K}$$

Otherwise, $$L = L'N_{step}$$

Embodiment 7

As discussed above, in a plurality of RBs with a size N, possible values of $RB_{start}$ and L can be discretized based on a resolution factor $N_{step}$, in accordance with some embodiments. In some embodiments, possible values of $RB_{start}$ and L may be respectively presented as:

$$RB_{start} = 0, N_{step}/K, 2N_{step}/K \ldots (K-1)N_{step}/K, N_{step},$$

$$(K+1)N_{step}/K \ldots \left(\left\lfloor \frac{KN}{N_{step}} \right\rfloor - K\right)\frac{N_{step}}{K} \text{ and}$$

$$L = N_{step}, 2 N_{step} \ldots \left\lfloor \frac{N}{N_{step}} \right\rfloor N_{step},$$

wherein K is a positive integer. In some embodiments, $N_{step}$ can be an integer multiple of K. Accordingly, respective resolutions of $RB_{start}$ and L may be presented as $N_{step}/K$ and $N_{step}$.

In an embodiment, the BS may select a sub-sequence with a starting RB location, $RB_{start}$, and an RB sequence length, L, from the plurality of RBs (in the size N). Accordingly, the BS determines an RIV associated with such a sub-sequence using the following equation (9):

$$\text{if } (L'-1) \leq \lfloor N'/2 \rfloor \text{ then} \tag{9}$$

$$RIV = (N'(L'-1) + \lfloor RB'_{start}/K \rfloor) + C \cdot (RB'_{start} \mod K)$$

else $$RIV = (N'(N'-L'+1) + (N'-1-\lfloor RB'_{start}/K \rfloor)) + C \cdot (RB'_{start} \mod K)$$

wherein $$RB'_{start} = K \cdot RB_{start}/N_{step}$$

$$N' = \lfloor N/N_{step} \rfloor$$

$$L' = L/N_{step}$$

$$C = \frac{N'(N'+1)}{2} \text{ or } 2^{\lceil \log_2(N'(N'+1)/2) \rceil}.$$

In some embodiments, after the BS uses the above-described equation (9) to determine the RIV, the BS then incorporate the RIV into control information (e.g., DCI) and send the control information to the UE through a downlink signal (e.g., a PDCCH signal). In some embodiments, the RIV may occupy "X" bits in the control information, wherein X is determined by the following equation:

when $C=N'(N'+1)/2, X=\lceil \log_2(KM) \rceil$ and when $C=2^{\lceil \log_2(N'(N'+1)/2) \rceil}, X=\lceil \log_2 M \rceil + \lceil \log_2 K \rceil$, wherein $M=N'(N'+1)/2$.

Similarly, in some cases, when N is not divisible by $N_{step}/K$, a technique may be further applied to correspond L' to L, in accordance with some embodiments. Specifically, when respective values of $RB'_{start}$ and L' satisfy $$KL' + RB'_{start} = \left\lfloor \frac{KN}{N_{step}} \right\rfloor,$$

L and L' may correspond to each other based on:

$$L = L'N_{step} + N \mod \frac{N_{step}}{K}.$$

Otherwise, $$L = L'N_{step}$$

Figure 7:
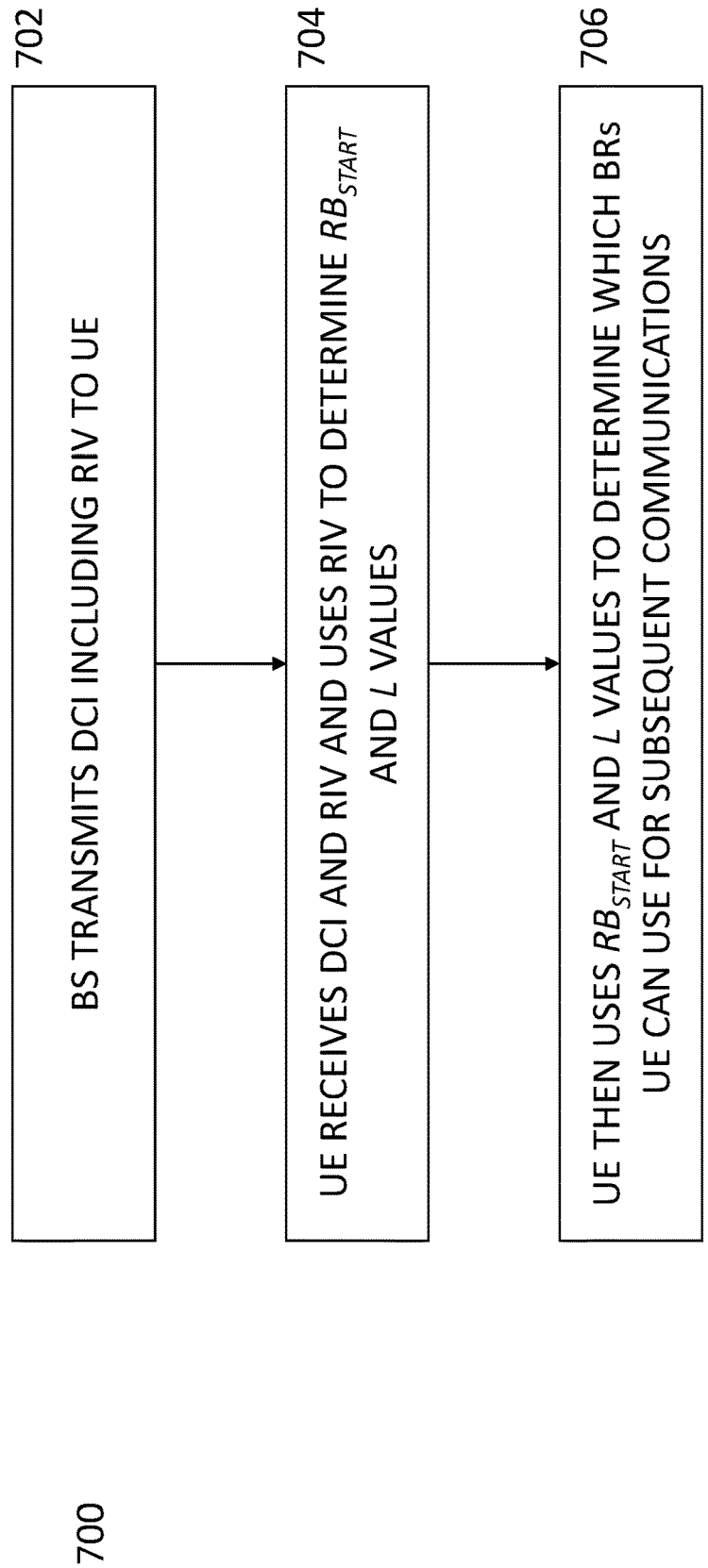
FIG. 7 illustrates a flowchart of a method of allocating resource blocks to a UE device, in accordance with some embodiments of the present disclosure.

FIG. 7 illustrates a flowchart of a method 700 of allocating resource blocks to a UE device (e.g., a UE), in accordance with some embodiments. The method 700 starts at operation 702, in which a BS transmits control information (DCI) to UE through PDCCH. Such DCI includes one of the above-described methods to allocate the resource blocks. In other words, whenever a signal containing the DCI is transmitted to a UE, such a signal includes an RIV, which corresponds to a single combination of $RB_{start}$ and L through at least one of the equations (1)-(9), as described above. Next, at operation 704, the UE receives the DCI and RIV and uses the RIV contained in the signal to determine respective values of $RB_{start}$ and L, using the same equations used by the BS to calculate the RIV value. At operation 706, the UE then can use the values of $RB_{start}$ and L to determine which resource blocks (which sub-sequence of resource blocks) the UE can use for subsequent communications with the BS.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
    determining a first resource indication value indicative of a first subset of a plurality of resource blocks to be allocated to a wireless communication device, wherein the first resource indication value is determined by a predefined equation using a single combination of a first parameter and a second parameter as an input; and
    transmitting the first resource indication value to the wireless communication device,
    wherein the predefined equation comprises at least one of:
    $W(L'-1)+RB'_{start}$, $(W-1)(L'-1)+RB'_{start}$, $(W-1)(N'-L'+1)+(W-2-RB'_{start})$, $W(N'-L')+(W-RB'_{start}-1)$, $K(N'(L'-1)+\lfloor RB'_{start}/K\rfloor))+(RB'_{start} \bmod K)$, $K(N'(N'-L'+1)+(N'-1-\lfloor RB'_{start}/K\rfloor))+(RB'_{start} \bmod K)$, $(N'(L'-1)+\lfloor RB'_{start}/K\rfloor)+C\cdot(RB'_{start} \bmod K)$, and $(N'(N'-L'+1)+(N'-1-\lfloor RB'_{start}/K\rfloor))+C\cdot(RB'_{start} \bmod K)$, wherein $RB'_{start}$ represents the first parameter ($RB_{start}$) being conditioned as $K\cdot RB_{start}/N_{step}$, L' represents the second parameter (L) being conditioned as $L/N_{step}$, $N'=\lfloor N/N_{step}\rfloor$, K is a predefined positive integer, N represents a maximum number of the plurality of resource blocks, $N_{step}$ represents a predefined resolution factor which is a positive integer, and W is a conditioned parameter determined by at least one of: K, N, and $N_{step}$.

2. The method of claim 1, wherein the first parameter indicates a starting resource block location of the first subset of the plurality of resource blocks, and the second parameter indicates a length of the first subset of the plurality of resource blocks.

3. The method of claim 2, further comprising:
determining a second resource indication value indicative of a second subset of the plurality of resource blocks to be allocated to the wireless communication device, wherein the second resource indication value is determined by the predefined equation using a single combination of a third parameter and a fourth parameter as an input; and
transmitting the second resource indication value to the wireless communication device,
wherein the third parameter indicates a starting resource block location of the second subset of the plurality of resource blocks, and the fourth parameter indicates a length of the second subset of the plurality of resource blocks.

4. The method of claim 3, wherein the first and third parameters are different from each other by a first non-zero number of resource blocks, and the second and fourth parameters are different from each other by a second non-zero number of resource blocks.

5. The method of claim 1, wherein when respective values of $RB'_{start}$ and L' satisfy $$2L' + RB'_{start} = \left\lfloor \frac{2N}{N_{step}} \right\rfloor,$$

L' and L further satisfy $$L = L'N_{step} + N \bmod \frac{N_{step}}{2},$$

and when respective values of $RB'_{start}$ and L' satisfy $$KL' + RB'_{start} = \left\lfloor \frac{KN}{N_{step}} \right\rfloor,$$

L' and L further satisfy $$L = L'N_{step} + N \bmod \frac{N_{step}}{K}.$$

6. The method of claim 1, wherein when K is equal to 2, if $L' \leq \lfloor (N'+1)/2 \rfloor$, the predefined equation is $W(L'-1)+RB'_{start}$, else, the predefined equation is $W(N'-L')+(W-RB'_{start}-1)$, and wherein W is determined by at least one of:

$$2\left(\left\lfloor \frac{2N}{N_{step}} \right\rfloor - \left\lfloor \frac{N}{N_{step}} \right\rfloor\right), \left\lfloor \frac{2N}{N_{step}} \right\rfloor,$$

$$\left\lfloor \frac{2N}{N_{step}} \right\rfloor + 1, 2\left(\left\lfloor \frac{2N}{N_{step}} \right\rfloor - \left\lfloor \frac{N}{N_{step}} \right\rfloor + 1\right),$$

$$\left\lfloor \frac{2N}{N_{step}} \right\rfloor + 2, \text{ and } \left\lfloor \frac{2N}{N_{step}} \right\rfloor + 3.$$

7. The method of claim 6, wherein when $N \bmod N_{step}=0$, or $N \bmod N_{step}=1$, W is determined as $$\left\lfloor \frac{2N}{N_{step}} \right\rfloor \text{ or } \left\lfloor \frac{2N}{N_{step}} \right\rfloor + 2,$$

and when $N \bmod N_{step}=2$, or $N \bmod N_{step}=3$, W is determined as $$\left\lfloor \frac{2N}{N_{step}} \right\rfloor + 1 \text{ or } \left\lfloor \frac{2N}{N_{step}} \right\rfloor + 3.$$

8. The method of claim 1, wherein if $L' \leq \lfloor (N'+1)/2 \rfloor$, the predefined equation is $W(L'-1)+RB'_{start}$, else, the predefined equation is $W(N'-L')+(W-RB'_{start}-1)$, and W is determined as $$2\left\lfloor \frac{KN}{N_{step}} \right\rfloor - (N'+1)K + 2.$$

9. The method of claim 1, wherein when K is equal to 2, if $(L'-1) \leq \lfloor N'/2 \rfloor$, the predefined equation is $2(N'(L'-1)+\lfloor RB'_{start}/2 \rfloor)+(RB'_{start} \bmod 2)$, else, the predefined equation is $2(N'(N'-L'+1)+(N'-1-\lfloor RB'_{start}/2 \rfloor))+(RB'_{start} \bmod 2)$.

10. The method of claim 1, wherein if $(L'-1) \leq \lfloor N'/2 \rfloor$, the predefined equation is $K(N'(L'-1)+\lfloor RB'_{start}/K \rfloor)+(RB'_{start} \bmod K)$, else, the predefined equation is $K(N'(N'-L'+1)+(N'-1-\lfloor RB'_{start}/K \rfloor))+(RB'_{start} \bmod K)$.

11. The method of claim 1, wherein if $(L'+1) \leq \lfloor N'/2 \rfloor$, the predefined equation is $(N'(L'-1)+\lfloor RB'_{start}/K \rfloor)+C\cdot(RB'_{start} \bmod K)$, else, the predefined equation is $(N'(N'-L'+1)+(N'-1-\lfloor RB'_{start}/K \rfloor))+C\cdot(RB'_{start} \bmod K)$, and wherein C is determined as either $N'(N'+1)/2$ or $2^{\lceil \log_2(N'(N'+1)/2) \rceil}$.

12. The method of claim 11, wherein the first resource indication value occupies X bits, when $C=N'(N'+1)/2$, $X=\lceil \log_2 KM \rceil$, when $C=2^{\lceil \log_2(N'(N'+1)/2) \rceil}$, $X=\lceil \log_2 M \rceil + \lceil \log_2 K \rceil$, and wherein $M=N'(N'+1)/2$.

13. The method of claim 1, wherein the first resource indication value occupies X bits, and $X=\lceil \log_2 M \rceil$, and wherein $$M = N'\left(\left\lfloor \frac{2N}{N_{step}} \right\rfloor - N'\right), N'\left(\left\lfloor \frac{KN}{N_{step}} \right\rfloor + 1 - \frac{K(N'+1)}{2}\right),$$

$$N'\left(\left\lfloor \frac{2N}{N_{step}} \right\rfloor + 1 - N'\right), N'(N'+1), \text{ or } \frac{KN'(N'+1)}{2}.$$

14. A method, comprising:
receiving, by a wireless communication device, a first resource indication value indicative of a first subset of a plurality of resource blocks to be allocated to the wireless communication device, wherein the first resource indication value is determined by a predefined equation using a single combination of a first parameter and a second parameter as an input; and
based on the received first resource indication value, determining the respective identifiers of the first subset of the plurality of resource blocks allocated to the wireless communication device,
wherein the predefined equation comprises at least one of: $W(L'-1)+RB'_{start}$, $(W-1)(L'-1)+RB'_{start}$, $(W-1)(N'-L'+1)+(W-2-RB'_{start})$, $W(N'-L')+(W-RB'_{start}-1)$, $K(N'(L'-1)+\lfloor RB'_{start}/K \rfloor)+(RB'_{start} \bmod K)$, $K(N'(N'-L'+1)+(N'-1-\lfloor RB'_{start}/K \rfloor))+(RB'_{start} \bmod K)$, $(N'(L'-1)+\lfloor RB'_{start}/K \rfloor)+C \cdot (RB'_{start} \bmod K)$, and $(N'(N'-L'+1)+(N'-1-\lfloor RB'_{start}/K \rfloor))+C \cdot (RB'_{start} \bmod K)$, wherein $RB'_{start}$ represents the first parameter ($RB_{start}$) being conditioned as $K \cdot RB_{start}/N_{step}$, L' represents the second parameter (L) being conditioned as $L/N_{step}$, $N'=\lfloor N/N_{step} \rfloor$, K is a predefined positive integer, N represents a maximum number of the plurality of resource blocks, $N_{step}$ represents a predefined resolution factor which is a positive integer, and W is a conditioned parameter determined only by at least one of: K, N, and $N_{step}$.

15. The method of claim 14, wherein the first parameter indicates a starting resource block location of the first subset of the plurality of resource blocks, and the second parameter indicates a length of the first subset of the plurality of resource blocks.

16. The method of claim 15, further comprising:
receiving, by the wireless communication device, a second resource indication value indicative of a second subset of the plurality of resource blocks to be allocated to the wireless communication device, wherein the second resource indication value is determined by the predefined equation using a single combination of a third parameter and a fourth parameter as an input; and
based on the received second resource indication value, determining the respective identifiers of the second subset of the plurality of resource blocks allocated to the wireless communication device,
wherein the third parameter indicates a starting resource block location of the second subset of the plurality of resource blocks, and the fourth parameter indicates a length of the second subset of the plurality of resource blocks.

17. The method of claim 16, wherein the first and third parameters are different from each other by a first non-zero number of resource blocks, and the second and fourth parameters are different from each other by a second non-zero number of resource blocks.

18. The method of claim 14, wherein when respective values of $RB'_{start}$ and L' satisfy $$2L' + RB'_{start} = \left\lfloor \frac{2N}{N_{step}} \right\rfloor,$$

L' and L further satisfy $$L = L' N_{step} + N \bmod \frac{N_{step}}{2},$$

and when respective values of $RB'_{start}$ and L' satisfy $$KL' + RB'_{start} = \left\lfloor \frac{KN}{N_{step}} \right\rfloor,$$

L' and L further satisfy $$L = L' N_{step} + N \bmod \frac{N_{step}}{K}.$$

* * * * *